United States Patent [19]

Yamamoto

[11] Patent Number: 5,010,324

[45] Date of Patent: Apr. 23, 1991

[54] SEQUENTIAL PAGE UNIT IMAGE DISPLAY DEVICE HAVING DISPLAY CONTROL MEMORY

[75] Inventor: Hikari Yamamoto, Kanagawa, Japan

[73] Assignee: Hitachi, Ltd., Tokyo, Japan

[21] Appl. No.: 245,210

[22] Filed: Sep. 16, 1988

[30] Foreign Application Priority Data

Sep. 16, 1987 [JP] Japan .................. 62-231716

[51] Int. Cl.⁵ ............................................. G09G 5/00
[52] U.S. Cl. ...................... 340/723; 340/724; 340/731
[58] Field of Search ............... 340/723, 724, 726, 727, 340/731, 750; 364/518, 521

[56] References Cited

U.S. PATENT DOCUMENTS

| | | | |
|---|---|---|---|
| 4,445,114 | 4/1984 | Stubben | 340/726 |
| 4,751,507 | 6/1988 | Hama et al. | 340/731 |
| 4,780,710 | 10/1988 | Tatsumi | 340/724 |
| 4,808,987 | 2/1989 | Takeda et al. | 340/731 |
| 4,812,836 | 3/1989 | Kurakake et al. | 340/724 |
| 4,862,150 | 8/1989 | Katsura et al. | 340/724 |

FOREIGN PATENT DOCUMENTS 62-19893  1/1987  Japan .

*Primary Examiner*—Jeffery A. Brier
*Attorney, Agent, or Firm*—Fay, Sharpe, Beall, Fagan, Minnich & McKee

[57] ABSTRACT

An image display device is provided with a display for displaying sequential page unit image data; a display control unit for controlling the display state by enabling the enlarging, reducing, rotating or scrolling of the image data of the page unit in accordance with an operator's instruction; and a display control data memory for storing display control data of a display position and a display state of the image data of a page unit. The image data of a next page is displayed using the display control data stored in the display control data memory, which can be set by the operator.

7 Claims, 4 Drawing Sheets

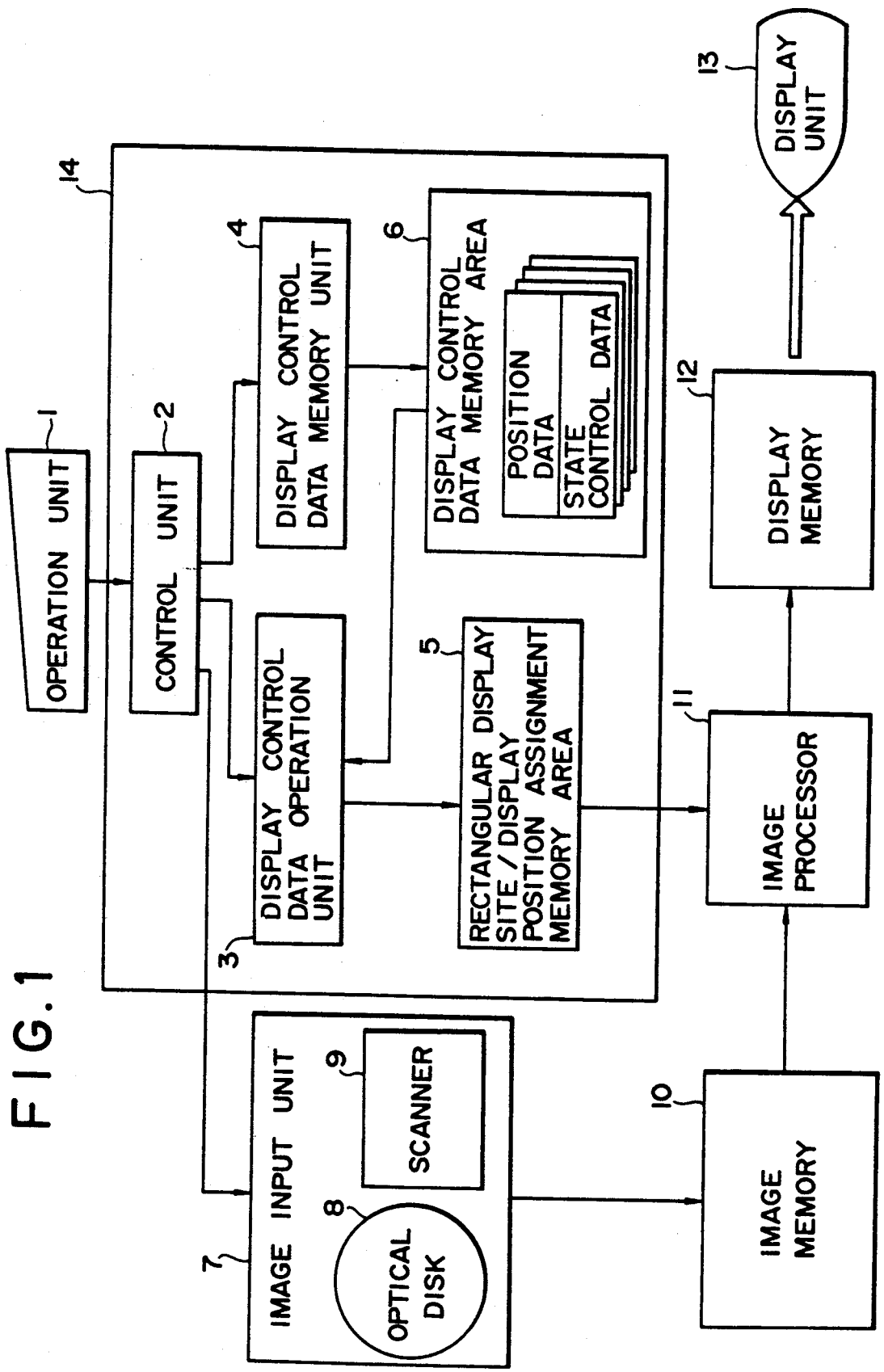

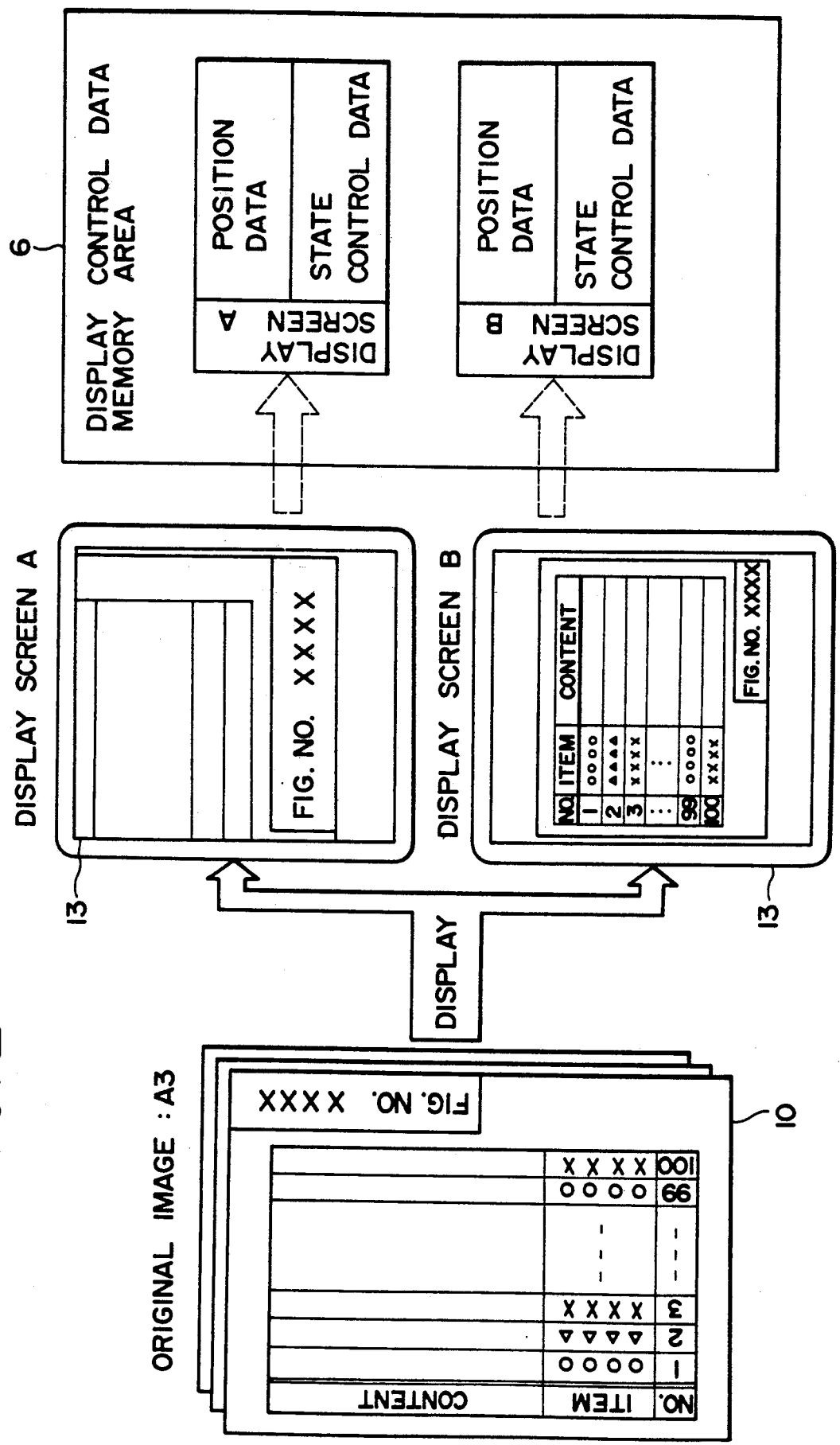

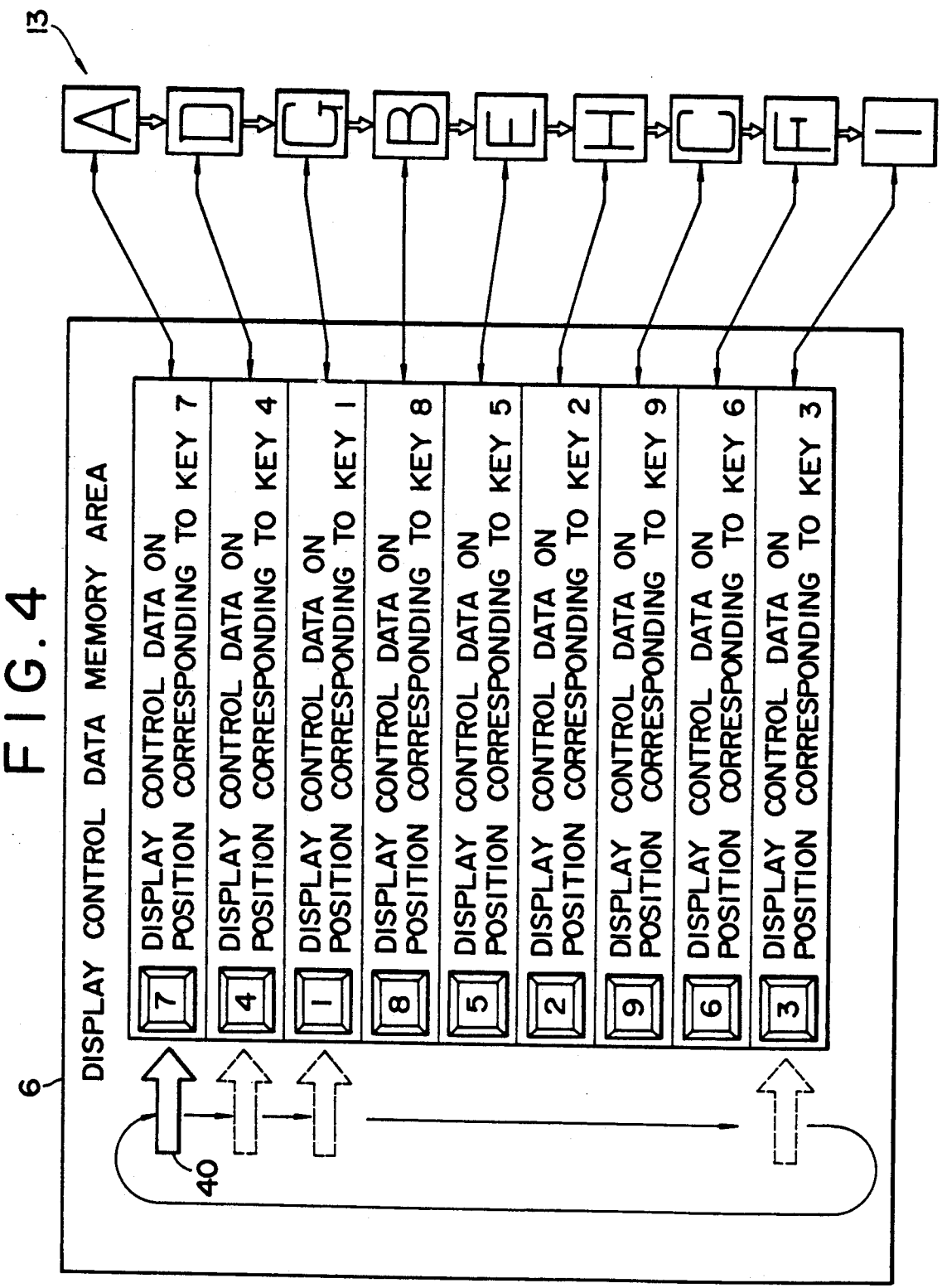

SEQUENTIAL PAGE UNIT IMAGE DISPLAY DEVICE HAVING DISPLAY CONTROL MEMORY

BACKGROUND OF THE INVENTION

The present invention relates to an image display device and, more particularly, to an image display device adapted to display image data of page units in regular sequence, which is capable of succesively displaying image data of a next page at a display position and in a display state at and in which image data of the previous page were displayed when image data of plural pages are displayed in consecutive order. The present invention is further directed to an image display method applicable to the image display device.

The image display device is preferred for displaying image data when an image size is to be displayed on each page for image data of a page unit or an enlarged size of an image is to be displayed larger than a displayable size on a display screen of the display unit.

Generally, image data are displayed by means of the display method which displays input image data as it is. This display method, however, can display only a portion of input image data if image data that is larger than a displayable size on the display screen of the display unit are to be entered. In this case, accordingly, an undisplayed portion of the image data should be displayed by scrolling a displayed image on the display screen thereof in longitudinal and/or transverse directions by means of an operation of a scrolling key.

The method of using the scrolling key of the display device, however, suffers from the disadvantage that the scrolling operation which displays each portion of the image data on the display screen is rendered more laborious as the image size of the input image data becomes larger, thus leading to a poor operability.

In order to improve such a poor operability with the method using the scrolling key. Japanese Patent Publication (laid-open) No. 19,893/1987 discloses an image scrolling method which is designed such that a rectangular portion of an original image to be displayed is computed on the basis of a display position assignment from the operator, the rectangular portion thereof is scrolled, and the image after scrolling is displayed. This scrolling method permits a display position assignment by means of a one-touch operation of keys from key 1 to key 9 of a numeric key pad, whose positions correspond, respectively, to the display position assignments on the display screen from the operation unit, thus improving the operation.

In displaying image data exceeding a size capable of being displayed within a displayable size of a display screen or in displaying an objective image display site of image data in an objective display state, the display of such image data is usually such that the original image is displayed as the image data stand and that the objective display site of the image data is then displayed in the objective display state in accordance with an instruction by an operator's instruction for altering a display state of the image by means of an operation for enlargement, reduction, rotation or scrolling.

Sequentially continous display of plural pages of image data can be effected by repeating the above operation for the image data of each page. More specifically, image data of a certain page is first displayed at an objective display position and in an objective display state on the display screen by means of operation for enlargement, reduction, rotation or scrolling and operation is then followed in order to display the image data of the next page, thus resetting display control data on the display position and state set by the previous display operation for the image data of the previous page and initializing the display position and state of the image data of the next page. For this reason, in order to display the image data of the next page at the same display position and state as those of the previous page, it is necessary to repeat the operation for enlargement, reduction, rotation or scrolling. Whenever, accordingly, image data different from those of the next coming page are tried to be displayed by the pressing of the "next page" key, the repetition of the operation is required in order to change the display position and state on the display screen of the display section to an objective display position and state from the initialized state on the display screen thereof. This operation is extremely laborious.

SUMMARY OF THE INVENTION

The present invention has the object to provide an image display device adapted to sequentially display image data of page units on the display screen thereof, which permits a display of the image data of the next page by following the display position and state at and in which the image data of the previous page were displayed in the case where several pages of image data are to be displayed in sequential order.

In order to accomplish the objects according to the present invention, the image display device comprises a display means for displaying image data of a page unit, a display control means for controlling a display state by enlarging, reducing, rotating or scrolling of the image data of the page unit by an operator's instruction, and a display control data memory means for storing the display control data for controlling a display position and a display state of the image data of the page unit so as to display the image data of a page by controlling the image data of the next page on the basis of the display control data in the display control data memory means for the previous page set by the operator's instruction.

The image display device according to the present invention is provided with the display control data memory means adapted to store the display control data for giving an instruction on a display position and a display state of the image data of a page unit, thus allowing the image data of a page to be displayed while a display state of the image data of the coming page is controlled using the display control data of the display control data memory means. More specifically, display control data is stored for a state in which the display control is implemented at an objective display position and in an objective state of a display screen at and in which image data of a certain page are being displayed, and the image data of the certain page is displayed while a state of displaying the image data of the coming page is controlled on the basis of the display control data stored in the display control data memory means. It is accordingly possible to display image data of plural pages successively while following the display position and state of the image data of the previous page, thus enabling the image data of the coming page to be displayed at the same display position and in the same display state as those of the previous page. This operation is repeated and the image data of all plural pages can be displayed in consecutive sequence.

The other objects and advantages will become apparent in the course of the description by way of the preferred embodiments with reference to the drawings.

BRIEF DESCRIPTION OF THE DRAWINGS

FIG. 1 is a block diagram illustrating a structure of an electronic file apparatus according to a preferred example of the present invention.

FIG. 2 is a view explaining one example of the use of the display control data memory area in FIG. 1.

FIG. 4 is a view explaining another example of the use of the display control data memory area in FIG. 1.

DESCRIPTION OF THE PREFERRED EMBODIMENTS

Figure 3A:
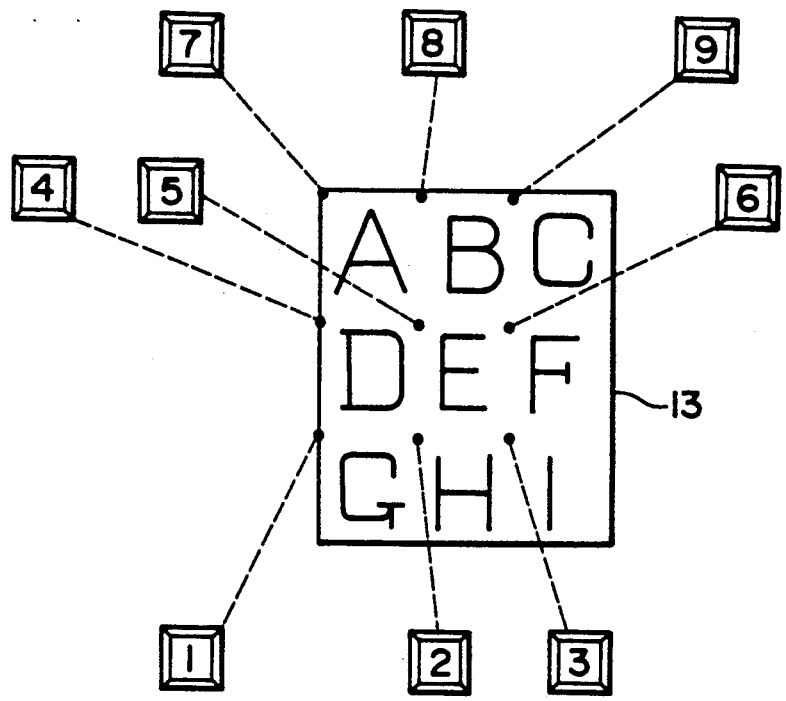
FIGS. 3a and 3b are views for explaining the relationship of the display screen sections with corresponding positions of the keys of a numeric key pad from key 1 to key 9.

In the electronic file apparatus of FIG. 1 illustrating the preferred example of the present invention, reference numeral 1 denotes an operation unit. The operator uses an operation unit 1 and provides a display control device 14 with an instruction for controlling a display state. The display control device 14 contains a control unit 2, a display control data operation unit 3, a display control data memory unit 4, a rectangular display site/-display position assignment memory area 5, and a display control data memory area 6, and provides an image processor 11 with display control data for controlling a display state by enlarging, reducing, rotating or scrolling image data to be displayed by an operator's instruction. An image input unit 7 has an optical disk 8 or a scanner 9, and it generates image data to be displayed and outputs the image data to an image memory 10. The image processor 11 develops the image data of the image memory 10 into dot data which are in turn stored in a display memory 12. The dot-data image data stored in the display memory 12 are displayed on a display screen of a display unit 13.

In developing the image data in the image memory 10 into dot data and storing them in the display memory 12, the image processor 11 develops the image data into dot data by extracting a predetermined portion of an objective image data from display control data set in the rectangular display site/display position assignment memory area 5 of the display control device 14. This development leads to a display of the objective image site of the objective image data on the display section 13 in a predetermined display state.

The following is a description of the operation of the electronic file apparatus. The operator gives a display instruction of image data of a certain page using the operation unit 1. The image data of the corresponding page are read in from the image input unit 7 into the image memory 10 and displayed on the display screen of the display unit 13 through the image processor 11 and the display memory 12. After the display of the image data, the image data on the display screen are to be displayed at an objective display position and in an objective display state by assigning the image data of the displayed page to one of enlargement, reduction, rotation or scrolling. The operator then presses down a display control data memory key (not shown) in the operation unit 1 and provides a memory instruction display control data, thus causing the control unit 2 to start the display control data memory unit 4. This operation allows the display control data memory area 6 to store the display position (a display reference coordinate on the image) and the display state (data on enlargement, reduction, rotation or scrolling) of the image data of the page currently on display. Thereafter, when a display instruction of image data of the next page is given by the operator upon depression of key "next page" (not shown) in the operation unit 1, the control unit 2 allows the start-up of the display control data operation unit 3 which in turn computes a coordinate of a rectangular display site and position of the image data of the next page on the basis of data on the display position and state stored in the display control data memory area 6, thereby setting a rectangular display site/display position assignment memory area 5. The display control data set above is then supplied to the image processor 11 which in turn effects the image processing to display the image data of the next page at the same display position and in the same display state as those of the previous page. When the operator further likewise presses down a key "next page", image data of the page coming after the coming page are to be displayed at the corresponding display position in the corresponding display state. This leads to a continuous display of image data of each of plural pages by succeeding the display position and the display state at and in which the image data of the previous page were displayed.

It is to be noted that the above description is directed to a display method of the type wherein plural images are to be displayed one by one in consecutive sequence on the basis of one display control data stored at the same display position and in the same display state as those at and in which the image data of the previous page were displayed. It is to be understood that image data of each page can be displayed using a plurality of display control data stored. One such example is shown in FIG. 2.

FIG. 2 is a view explaining usage of another example of the display control data memory area. As shown in FIG. 2, the display control data memory area 6 stores display control data in two display positions and two display states corresponding to display screens A and B. When an operator's display instruction on image data of a certain page is given from the operation unit 1, the control unit 2 is operated to start the display control data operation unit 3 which in turn computes a rectangular coordinate of a display site and position on the basis of the display control data corresponding to the display screen A stored in the display control data memory area 6, thereby leading to a display of the image data in a display format of the display screen A as shown in FIG. 2. Upon depression of key "next page", image data of the next page coming immediately after the previous page are displayed by succeeding the display format of the display screen A. After the display of the image data of plural pages, the operator presses down a display state switching key allowing the control unit 2 to start-up the display control data operation unit 3 and compute a rectangular coordinate of a display site and position on the basis of the display control data corresponding to the display screen B stored in the display control data memory area 6. This operation then permits a display of the image data of each page in the display format of the display screen B as shown in FIG. 2. Thus the image display by operation of key "next page" succeeds in the display format of the display screen B leading to a display of image data of plural pages. Switching of the display format assigning the display position and state can be effected by an operator's one-touch operation of the display state switching key.

Figure 3B:
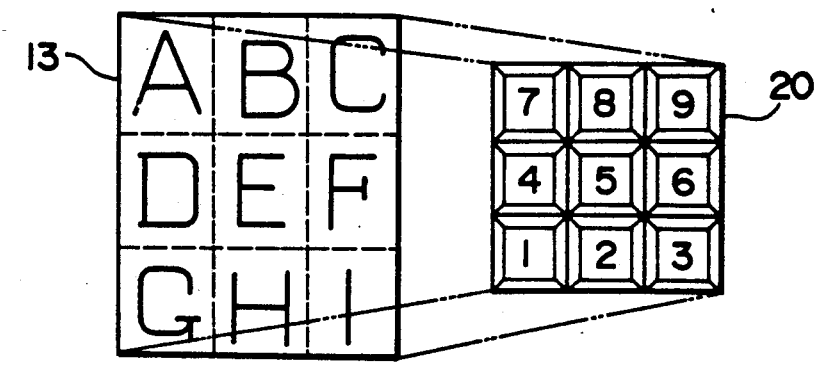

In FIG. 2, it is described that two kinds of display control data are accommodated and two kinds of the display formats of the display states are set. It is to be understood, however, that more kinds of display formats may be set using more kinds of display control data. For example, as shown in FIG. 3a and FIG. 3b, a display screen of one image data is divided into 9 sections so as to correspond to the positions of a numeric key pad or "ten-keys" 20 from key 1 to key 9. Display control data on the display positions (FIG. 3a) and display states (FIG. 3b) of the divided image sections corresponding to the position of each key position is stored in the display control data memory area 6 in the order addressed by a pointer 40 as shown in FIG. 4. The pointer 40 is provided in the display control data memory area 6, which manages the order of reading out each of 9 kinds of display control data stored in the display control data memory area 6. An initial value of the pointer 40 is used as display control data on the position corresponding to key 7. By an operator's instruction for a display of image data by assigning a certain page, the image data of the corresponding page are displayed on the basis of display control data for displaying the image section corresponding to the position of key 7 indicated by the current pointer 40. Upon depression of key "next page", image data of the next page coming after the previous page are displayed using the display control data on the position corresponding to key 7. In this embodiment, the pressing of the display state switching key renews the pointer 40 thus switching the display control data for key 4 to display control data on the position corresponding to key 4. Depression of the display state switching key renews the pointer 40 thus switching to display control data on the position corresponding to key 1. Depression of the display state switching key further renews the pointer 40 in succession and switches display control data on the position corresponding to each of nine keys. As described hereinabove, this embodiment is directed to renewal of the pointer 40 and the resultant switching of display control data on the position corresponding to each key. It is to be noted, however, that a key of the numeric key pad from key 1 to key 9 may be used as a display state switching key instead of the pointer. In this case, one of keys 1-9 is depressed permitting the direct switching of display control data on the position corresponding to each of keys 1-9.

The present invention has been specifically described by way of examples, and it should be understood that the present invention is not restricted to those examples as have been described above and encompasses various modifications within the scope of the spirit of the present invention.

As have been described hereinabove, the image display device according to the present invention permits a display of image data of the next page by an operator's instruction by following a display position and state at and in which image data of the previous page were displayed when image data of plural pages are displayed in sequence. This accordingly can reduce a number of operation such as scrolling for a display on a display screen which is otherwise required for displaying image data of plural pages.

What is claimed is:

1. An image display device, comprising:
   an operation input means for receiving an operator's instruction;
   a display means for displaying image data of a page unit;
   a display control data generator means for generating display control data for controlling a display state and a display position by enlarging, reducing, rotating or scrolling the image data of a page unit in accordance with an operator's instruction;
   a display control data memory means for storing display control data of a display state position and a display state generated by said display control data generating means; and
   a display control means for controlling a display state of image data of a next page by using the display control data stored in said display control data memory means in accordance with an instruction input by an operator.

2. An image display device as claimed in claim 1, wherein the display control data stored in said display control data memory means is data in which data of a control over a display position and a display state of image data after a display state of the image data of a page unit has been set by enlargement, reduction, rotation or scrolling by an operator's instruction is read-in by an operator's instruction for storing display control data.

3. An image display device as claimed in claim 1, wherein the display control data stored in said display control data memory means is display control data for controlling a display position and a display state of plural pages of image data of a page unit.

4. An image display device as claimed in claim 1, wherein said operation input means for receiving an operator's instruction has display instruction keys including key 1 to key 9, the display control data stored in said display control data memory means is display control data for controlling a display position and a display state of plural pages of image data of a page unit, and different kinds of plural display control data are read in accordance with the depression of each key of from key 1 to key 9.

5. An image display device, comprising:
   an operation unit adapted to receive an operator's instruction for a display operation;
   an image input unit adapted to generate image data;
   an image memory for storing the image data;
   a display control device for receiving and storing display control data input to said operation unit for controlling a display state by enlarging, reducing, rotating or scrolling the image data, and reading out and outputting the display control data;
   image processor means receiving the stored display control data from said display control device for sequentially subjecting the image data of a plurality of page units from the image memory to image processing and outputting display image data in a current display state that corresponds to a display state for the display image data of a previous page unit until display control data received by said display control device changes from the stored display control data;
   a display memory storing the outputted display image data; and
   a display unit adapted to display the display image data.

6. An image display device as claimed in claim 5, wherein:

the image input unit contains an optical disk device and a scanner; and the image data constitute image data of each page and the image data are read out per page to generate the image data.

7. An image display method comprising:

displaying image data of a page unit on a display screen;

controlling a display of the image data with predetermined display control data representing a display position and a display state on the display screen by enlarging, reducing, rotating or scrolling the image data displayed on the display screen by an operator's instruction;

storing the display control data set; and displaying image data of a different page unit by following a display position and a display state of the image data of a page unit displayed previously, using the display control data stored.

* * * * *